United States Patent [19]
Trandin et al.

[11] 3,759,166
[45] Sept. 18, 1973

[54] APPARATUS FOR PEELING FRUITS AND VEGETABLES

[76] Inventors: Georgy Gavrilovich Trandin; Vladimir Andreevich Khrichev; Evgeny Petrovich Sykalo; Valery Petrovich Burakov, all of Krasnodar, U.S.S.R.; Vasily Iliich Krasnobaev, deceased, late of Krasnodar, U.S.S.R.; by Anna Nikolaevna Krasnobaeva, administratrix, Krasnodar, U.S.S.R.

[22] Filed: Apr. 16, 1971

[21] Appl. No.: 134,691

[52] U.S. Cl.................. 99/472, 99/233.2, 99/233.6
[51] Int. Cl............................................. A23n 7/00
[58] Field of Search...................... 146/47, 48, 223; 99/427

[56] References Cited
UNITED STATES PATENTS
| | | | |
|---|---|---|---|
| 1,445,742 | 2/1923 | Blair | 146/48 X |
| 2,429,785 | 10/1947 | Winters | 146/223 X |
| 2,490,112 | 12/1949 | Winters | 146/48 |

*Primary Examiner*—Willie G. Abercrombie
*Attorney*—Holman & Stern and Downing E. Seebold

[57] ABSTRACT

An apparatus for peeling produce in which a chamber is gravity-fed and fruits or vegetables charged thereinto are hermetically sealed by gates and the chamber is supplied with a pressurized steam, and after subjecting the fruits or vegetables to steam, the pressure in the chamber is instantaneously dropped to a value below atmoshperic pressure by means of a vacuum condenser through the intermediary of a valve and the produce is peeled.

3 Claims, 2 Drawing Figures

APPARATUS FOR PEELING FRUITS AND VEGETABLES

BACKGROUND OF THE INVENTION

The present invention relates to an apparatus for peeling fruits and vegetables.

PRIOR ART

There are widely known methods and apparatus for processing vegetables by pressurized steam. In accordance with these methods, vegetables are charged through a rotary-type sluice gate-batcher into a hermetically sealed chamber, and are processed by steam supplied under a pressure of 3.5–4.5 $kg/cm^2$ during 40–70 seconds. While being processed by the steam, the vegetables are displaced along the chamber by a screw conveyer from the point of charging (the charging hole) to the point of discharge (the discharging hole). The vegetables are discharged through a sluice gate-batcher installed at the discharging hole, into a washing-and-peeling machine in which they are peeled mechanically.

The prior method and apparatus for processing vegetables by steam are disadvantageous since this method can only be used for processing vegetables of a hard consistency (for example, potatoes, carrots), whereas fruits and vegetables of a delicate consistency cannot be peeled since they quickly begin to cook and become soft.

After vegetables (fruits) have been processed by steam, their surface layer has a temperature of 100°C and the heat continues penetrating inside, thereby increasing the depth of the layer being boiled, which results in a great amount of by-products during the subsequent peeling operation in peeling machines.

OBJECTS AND SUMMARY OF THE INVENTION

It is an object of the present invention to eliminate the above-mentioned disadvantages.

The object of the present invention is the provision of an apparatus for processing fruits and vegetables by steam, that makes it possible to peel substantially all fruits and vegetables irrespective of their consistency by boiling them through a minimal depth, and insuring, at the same time, incomplete or complete peeling by instantaneous cooling of the heated surface layer of the fruits or vegetables.

This object is accomplished according to the apparatus for peeling fruits or vegetables whereby the produce is placed in a closed chamber and is processed by steam, and that, in accordance with the present invention, after the fruits or vegetables have been processed, the pressure in the chamber is instantaneously dropped down to a value below the atmospheric pressure.

It is expedient to choose the pressure of the steam used for processing fruits or vegetables within the range of 0.5–8 $kg/cm^2$, and the duration of the processing within the range of 50 – 5 sec., respectively. Such processing conditions provide for most qualitative, peeling of fruits or vegetables, and for a minimal amount of by-products.

More particularly, the apparatus includes a chamber provided with hermitically sealed charging and discharging holes, which is communicated with a steam source, and, in accordance with the present invention, is mounted so that the fruits or vegetables processed therein are gravity-fed, and has a valve for instantaneously dropping the chamber pressure by communicating it with a vacuum vessel.

It is also expedient to construct the chamber with three sections disposed one above another and separated from one another by gates which communicate the sections by pairs; the middle section being communicated with the steam source, and the upper and lower sections being communicated with the valves for instantaneously dropping the pressure.

The expedient of the chamber section makes it possible to carry out a continuous processing of fruits or vegetables, and to mix them without employing any mechanical means.

It has been found out as a results of experiments that it is expedient to intercommunicate the valves for instantaneously dropping the pressure, and to communicate them with a vacuum condenser, which serves as a vacuum vessel.

This embodiment affects an instantaneous pressure drop in the chamber below the atmospheric pressure, and, consequently, provides a high-quality peeling of fruits or vegetables and their simultaneous or instantaneous cooling.

It is no less expedient to incorporate a spring-loaded locking member and pusher in the valve for instantaneously dropping the pressure through the intermediary of a spring disposed thereinbetween.

When embodied like this, the valve is simple in manufacture and use, and provides for an instantaneous droppage of the pressure in the chamber.

The apparatus for peeling fruits and vegetables, embodied in accordance with the present invention, makes it possible to peel the majority of fruits or vegetables, produced, at the same time, a minimal amount of by-products, and preserving the shape and consistency of the fruits or vegetables being peeled.

The following description of a specific exemplary embodiment of the present invention is given with reference to the accompanying drawings forming a part thereof, in which:

DETAILED DESCRIPTION OF THE INVENTION

Figure 1:
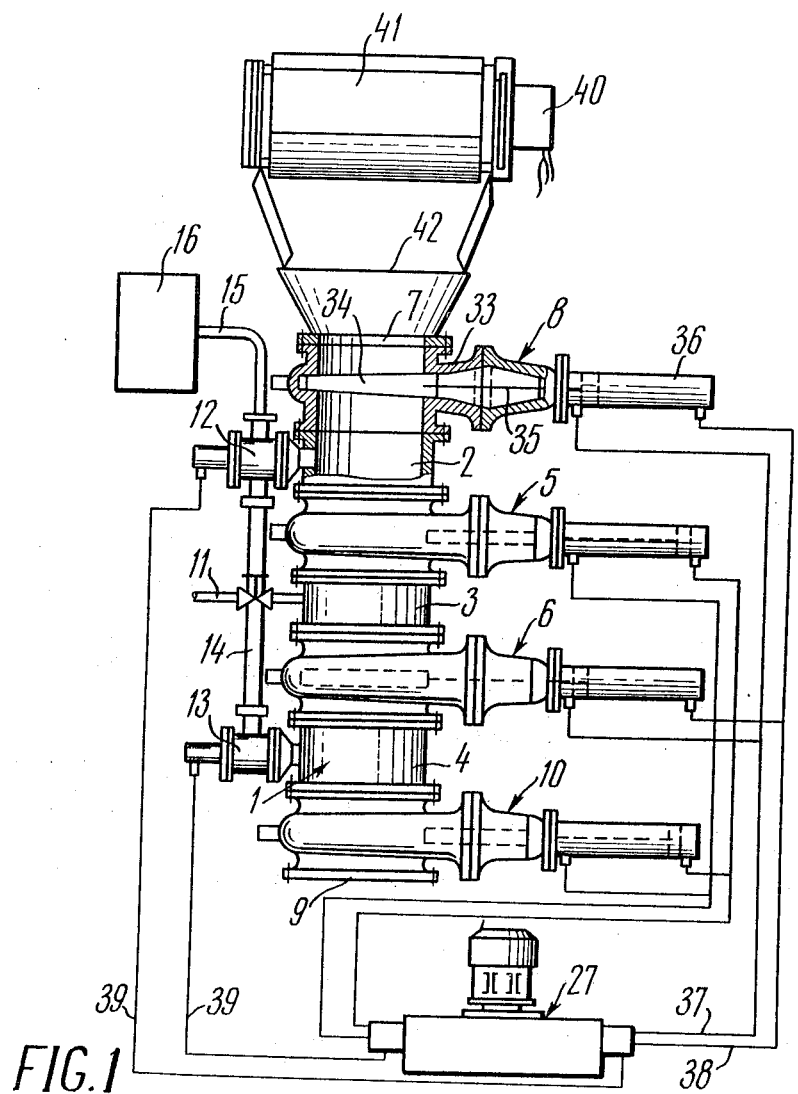
FIG. 1 shows a general view partially in section of an apparatus for peeling fruits and vegetables, according to the present invention.

In accordance with the present invention produce, i.e. fruits or vegetables are gravity charged into a chamber 1 (FIG. 1), which is then hermetically sealed and is supplied with a pressurized steam.

The fruits or vegetables are subjected to a short-time processing by steam, with the duration of the processing and the pressure of the steam being chosen depending upon the species, variety, degree of ripeness and term of storage of the fruits or vegetables. For fruits and vegetables of a hard consistency, such as potatoes, the pressure of the steam is taken as high as 8$kg/cm^2$ and the duration of the processing - 10 sec.

For vegetables of a delicate consistency (for example, tomatoes) the pressure of the steam is taken from 0.7 to 4 $kg/cm^2$, and the duration of the processing from 20 to 5 sec.

To provide for a uniform processing of fruits or vegetables by steam, it is desirable to mix them.

Under the action of the temperature of the steam the fine or thin surface layer of the fruits and vegetables is quickly heated, and the connection between the peel and the fruit becomes weaker.

With the processing completed, the pressure of the steam is instantaneously dropped below the atmospheric pressure, for instance, down to 720 mm of Hg.

During the instantaneous droppage of the pressure, the heated moisture of the surface layer of fruits or vegetables becomes super-heated, instantaneously boils, and the peel is either torn or torn off the fruits or vegetables, whereupon it is completely removed in a washing machine.

The apparatus according to the present invention comprises the chamber 1 which is arranged vertically, and accomodates vegetables to be processed (in the present example we shall consider the peeling process of tomatoes), and consists of three sections 2, 3 and 4 arranged in succession one above another. The inner spaces of the sections are separated one from another by gates 5 and 6. A charging hole or exit 7 is overlapped by a gate 8, and a discharging hole 9 by a gate 10.

The chamber 1 can be inclined but in such a manner that fruits or vegetables charged thereinto gravitate into the successive sections 2, 3 and 4.

The middle section 3 is communicated by a pipe branch 11 with a source of pressurized steam 11a.

The upper and lower sections 2 and 4 respectively are provided with valves 12 and 13, respectively, with said valves being used to instantaneously drop the pressure. These valves are mounted directly on the sections 2 and 4. The valves 12 and 13 are intercommunicated by a pipe line 14, and are communicated by a pipe line 15 with a vacuum vessel, which is essentially a vacuum condenser 16.

Figure 2:
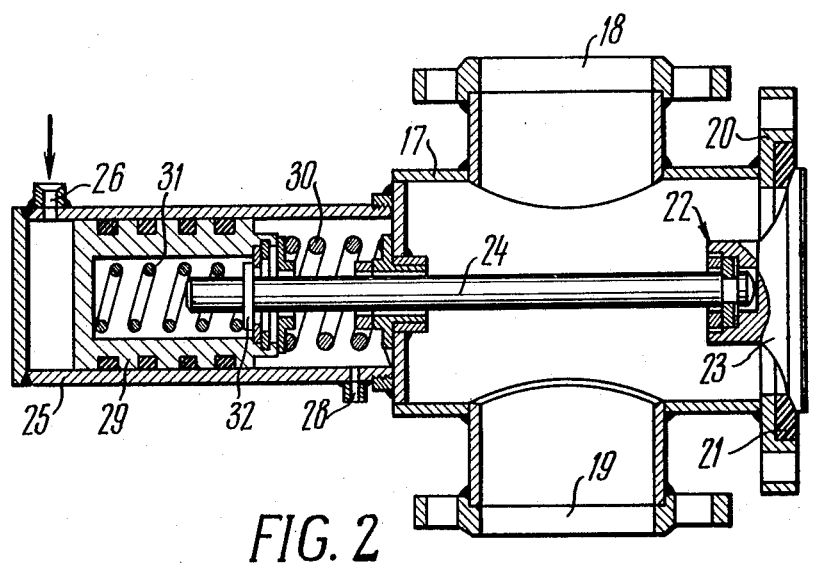
FIG. 2 shows an enlarged longitudinal section of a valve for instantaneously dropping the pressure, according to the invention.

The valve 12 used for instantaneously dropping the pressure (the valve 13 being fashioned identically) has a housing 17 (FIG. 2) provided with holes 18 and 19 to be connected to the pipe lines 14 (FIG. 1) and 15. A flange 20 (FIG. 2) is used to secure the valve 12 to the body of the section 2. Mounted on the flange 20 is a seat 21 having a locking or valving member 22 consisting of a valve disc 23 and a rod 24, thrusting thereagainst.

Secured to the housing 17 is a cylinder 25 having a hole 26 used to connect it to a hydraulic drive 27 (FIG. 1), and a drainage hole 28. The cylinder 25 accommodates a piston 29 which serves as a pusher for opening the locking or valving member 22. Mounted between the piston 29 and the wall of the housing 17 on the rod 24 is a spring 30 holding the locking or valving member 22 in the closed position.

The inner space of the piston 29 lodges a spring 31 which by one end portion thrusts against the bottom of the piston 29 and by other end portion against a collar 32 provided on the rod 24. This spring converts the kinetic energy produced in the course of movement of the piston into a potential one, which energy is then converted back into the kinetic energy of the instantaneous movement of the locking or valving member 22.

The gate 8 (FIG. 1) (the gates 5, 6, 10 are identical, and, therefore, what is said with respect to the gate 8 also refers to the same extent to the other gates) comprises a housing 33 accomodating a wedge 34 overlapping transversely of the space of the. The wedge 34 is connected by a rod 35 with a piston in a hydraulic cylinder 36 supplied with a liquid from the hydraulic drive 27 via pipe lines 37 and 38.

The hydraulic drive 27 is communicated by pipe lines 39 via the hole 26 (FIG. 2) with the variable volume space of the cylinder 25 behind piston 29.

Control over the displacement of the wedges 34 of the gates 5, 6, 8, 10 and the valves 12, 13 used for instantaneously dropping the pressure is effected by an electrical control device 40 mounted on a driven shaft (not shown in the drawing) of a charging elevator 41.

With the distribution device mounted in the aforedescribed manner, it is possible to synchronize the operation of the apparatus and the charging elevator, and, in the case of a change in the rate of charging, to automatically vary the time interval after which the gates connected in pairs are closed and opened.

The gate 5 (when being closed and opened) moves in the same direction as the gates 10, and the gate 8 moves in the same direction as the gates 6.

The apparatus for peeling fruits and vegetables functions as follows:

Prior to its operation, during 5 minutes the apparatus is heated by steam supplied via the pipe branch 11 (FIG. 1) from the steam source 11a into the middle section 3 from which it is distributed along the whole chamber.

The pressure of the steam is taken depending on the variety, degree of ripeness and term of storage of the vegetables and for tomatoes this pressure is taken within the range of $0.7 \times 4$ kg/cm$^2$.

With the apparatus heated and the gate 8 in the closed position, the charging elevator 41 delivers a batch of tomatoes into a hopper 42 and onto the wedge 34 of the gate 8.

After a batch of tomatoes is charged, the distribution device 40 sends a signal to the hydraulic drive 27 to open the gates 8 and 6, with the gates 5 and 10 being closed at this moment. With the gates 8 and 6 being opened, the tomatoes descend from the wedge 34 of the gate 8 into the section 2 onto the wedge 34 of the gate 5.

After the vegetables have been transferred completely into the section 2, the gates 8 and 6 are closed. Thereafter, the distribution device 40 sends a signal to the hydraulic drive 27 to open the gates 5 and 10. As soon as the wedges 34 of the gates 5 and 10 are slightly opened, the steam from the middle section 3 bursts into the upper section 2, and the tomatoes start being processed by the steam. As the gates 5 and 10 are further opened, the tomatoes from the wedge 34 of the gate 5 descend into the middle section 3 onto the wedge 34 of the gate 6 and continue to be processed by the steam.

The tomatoes are processed by the steam for a predetermined period depending upon their variety and degree of ripeness. With the gates 5 and 10 opened completely, the distribution device 40 sends a signal to close the gates 5 and 10, and the latter are closed. At the moment when all the gates are closed; the distribution device 40 sends a signal to open the valve 12 in order to drop the pressure in the section 2 before it is supplied with a next batch of tomatoes.

Under the action of the pressure of the liquid the piston 29 (FIG. 2) moves in the direction to a pan the opening of the locking or valve member 22, thereby compressing the springs 30 and 31. The locking member 22 remains closed in this case, as the force developed by the spring 31 is not sufficient to overcome the pressure exerted by the steam upon the disc 23. When the spring 31 is completely compressed, the piston 29 thrusts with its bottom against the rod 24 of the locking member 22 and pushes it forward to be opened, the disc 23 leaving the seat 21 at this moment. The pressure exerted upon the disc 23 immediately drops. At this moment the spring 31 expands and instantaneously moves the locking member 22 into the open position. The steam is pumped out of the upper section via the holes 18 and the pipe line 15 (FIG. 1) into the condenser 16, with the pressure in the upper section 2 dropping below the atmospheric pressure. After the pressure drop, the distribution device sends a signal to close the valve 12. Under the action of the spring 30, the piston 29 (FIG. 2) is retracted to its initial position, thereby forcing out the working liquid, and the disc 23 of the locking member 22 once seals on the seat 21.

While the gates 8 (FIG. 1) and 6 are closed, the hopper 42 is charged with a next batch of tomatoes.

The distribution device 40 sends a signal to open the gates 8 and 6. As soon as the gates 8 and 6 are slightly opened, the steam from the middle section 3 comes into the lower section 4, and during the further opening of the gate 6, tomatoes descend into the lower section 4 onto the wedge 34 of the gate 10.

Concurrently, a next batch of tomatoes is poured from the hopper 42 into the upper section 2, and the gates 8 and 6 are closed.

At the moment when all the gates are closed, a signal is given to open the valve 13 to instantaneously drop the pressure in the section 4. The valve 13 is operating at this moment in a manner analogous to the aforedescribed manner of operation of the valve 12.

With the tomatoes displacing from the upper section 2 into the lower section 4, the fine surface layer of the tomatoes is quickly heated. During the instantaneous drop of the pressure of the steam in the lower section, the heated moisture of the surface layer of the tomatoes instantaneously boils and the tomatoes are peeled by the steam thus formed.

After the instantaneous drop of the pressure of the steam in the lower section 4, the valve 13 is closed, then a signal to open the gates 5 and 10 is supplied. The vegetables are discharged from the section 4, and, then, are delivered into a washing machine (not shown) in which the tomatoes are peeled, whereas the tomatoes to be found in the section 2 start being processed by the steam, and, as the gates 5 are opened, are poured into the middle section 3.

Then, the whole process is repeated.

Thus, a continuous process of tomatoes peeling is effected.

The process of peeling produce i.e. various fruits and vegetables is effected in an analogous way be choosing an appropriate pressure of the steam and duration of the processing.

The apparatus for peeling vegetables, constructed in accordance with the present invention, is simple in manufacture, convenient in use, provides for a high-quality peeling of fruits and vegetables, producing, at the same time, a minimal amount of by-products, and preserves the shape and consistency of fruits and vegetables being peeled.

We claim

1. An apparatus for peeling fruits or vegetables, including a substantially vertically disposed chamber into which the fruits or vegetables are introduced and move downwardly therein via gravity for treatment with pressurized steam, said chamber being defined by first, second and third successively arranged fixed sections, hermetically sealed gates separating one section from another in one position and providing communication between adjacent sections in a second position, a source of pressurized steam, means connecting the second section with the source of steam, said connecting means including a valve, a vacuum vessel, means connecting the first and third sections with the vacuum vessel, said last named connecting means including a valve for each of the first and third sections ensuring an instantaneous pressure drop, and means for directing the steam from the chamber to the vacuum vessel in which the steam is condensed, the arrangement being such that when the fruits or vegetables have been introduced into the first section, the gates for the first and third sections are in said one position, and upon moving the gate for the second section toward said second position, steam in the second section enters the first section for processing the fruits or vegetables therein and when the gate for the second section reaches the second position, the fruits or vegetables enter the second section for continued steam processing and upon moving the gate for the second section to the first position, the valve in the connecting means between the first section and the vacuum vessel is opened to drop the pressure in the first section and steam in the first section is directed to the vacuum vessel wherein the steam is condensed.

2. The apparatus as claimed in claim 1 in which each valve in the means connecting the first and third sections to the vacuum vessel includes a spring-loaded locking member and a pusher operably connected via a spring to the locking member.

3. The apparatus as claimed in claim 1 in which said vacuum vessel is a vacuum condenser.

* * * * *